June 5, 1962 J. E. DURKEE 3,038,071
TRANSISTOR RECEIVER SQUELCH CIRCUIT
Filed June 3, 1958
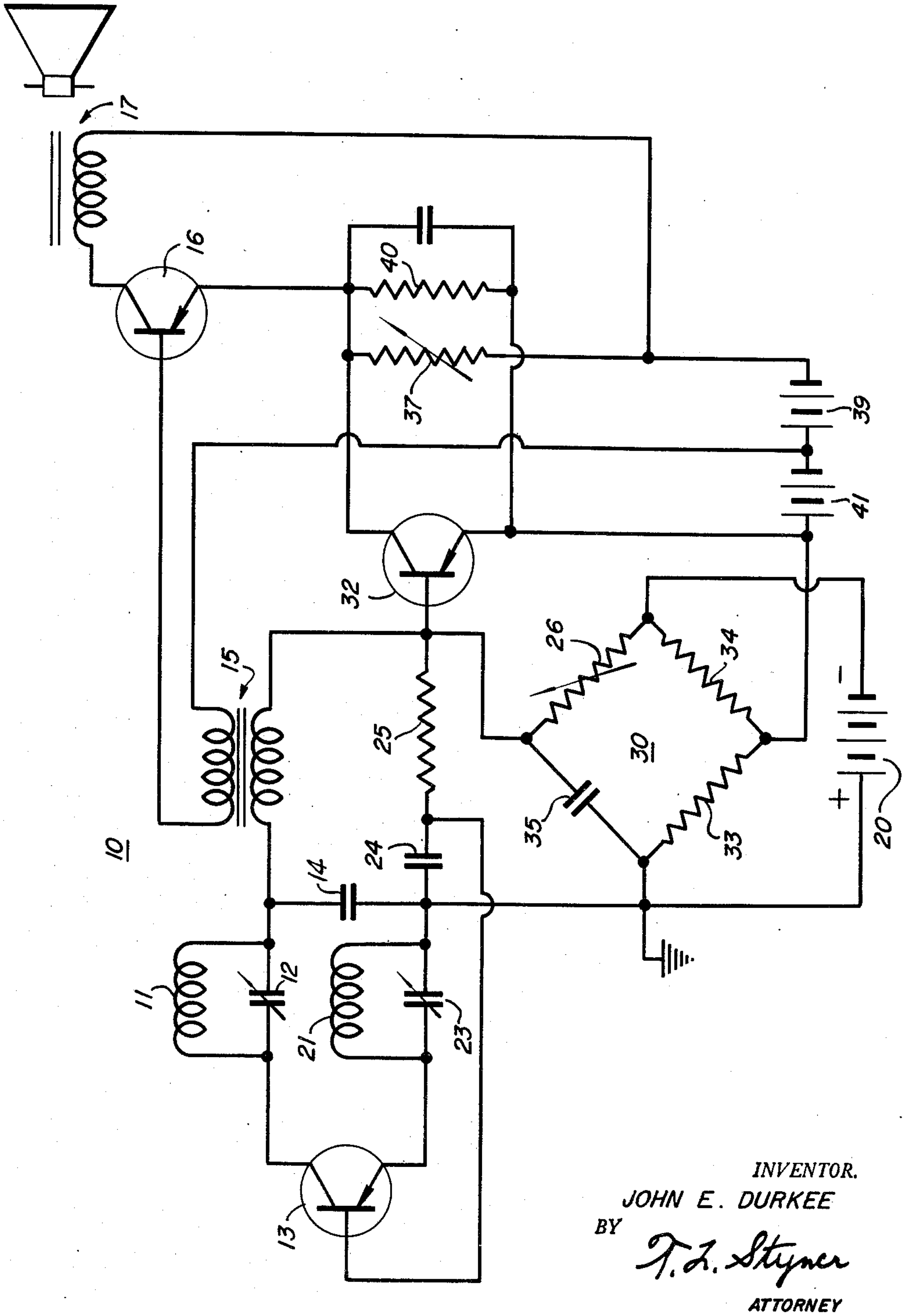
INVENTOR.
JOHN E. DURKEE
BY T. L. Styner
ATTORNEY United States Patent Office 3,038,071
Patented June 5, 1962

3,038,071

TRANSISTOR RECEIVER SQUELCH CIRCUIT

John E. Durkee, Conesus, N.Y., assignor to General Dynamics Corporation, Rochester, N.Y., a corporation of Delaware Filed June 3, 1958, Ser. No. 739,559
7 Claims. (Cl. 250—20)

The present invention relates to radio receivers and it particularly relates to a new and improved circuit for squelching the audio circuits of the receiver in the absence of a received carrier wave.

An object of the present invention is to provide a new and improved squelch circuit.

Another object of the present invention is to provide a squelch circuit which is responsive to changes in the internal impedance of the non-linear impedance device employed in the detector of a radio receiver for squelching the audio circuits of the receiver in the absence of a received carrier wave.

Another object of the present invention is to provide a squelch circuit which is sensitive to very small percentage changes in the output current of the detector stage of the receiver for squelching the audio stages of the receiver during the absence of a received signal.

Briefly, the above and further objects are realized in accordance with the present invention by providing a resistive bridge which detects changes in the resistance of the detector circut of the receiver and provides an output signal for biasing the audio stages of the receiver beyond cutoff during the absence of a received signal.

Many other objects and advantages of the present invention will become apparent from a consideration of the following detailed description when taken in conjunction with the following drawing which is a schematic circuit diagram of a radio receiver embodying the present invention.

Referring now to the drawing, a radio receiver 10 comprises an antenna coil 11 for intercepting an audio modulated radio frequency signal and a trimmer capacitor 12 is connected across the coil 11 to provide the usual tank circuit for selecting a desired radio frequency signal from the various signals which may be intercepted by the antenna coil 11. The antenna coil 11 and the trimmer capacitor 12 are serially connected in the collector circuit of a PNP type junction transistor 13 which provides the necessary non-linearity for demodulating or detecting the received audio modulated signal to provide in the collector circuit the audio components of the received wave. An RF bypass capacitor 14 is connected between one end of the antenna coil 11 and the emitter circuit of the transistor 13 to separate the radio frequency components of the collector current from the detected audio frequency components. The detected audio signal is coupled by means of a transformer 15 to the base of a PNP junction transistor 16 which provides the necessary amplification to drive a suitable loudspeaker 17 whose voice coil is connected in the collector circuit of the transistor 16. The detector circuit including the transistor 13 is energized by means of a battery 20 having the positive pole thereof connected through a coil 21 to the emitter of the transistor 13. The coil 21 provides a very low D.C. impedance between the battery 20 and the emitter of the transistor 13 so that for practical purposes the emitter of the transistor 13 is directly connected for D.C. voltages to the positive pole of the battery 20.

Since the receiver 10 is designed for operation in the UHF frequency band, the internal collector-to-emitter capacitance of the transistor 13, which may be a barrier type junction transistor, is normally sufficient to cause continuous oscillation of the detector circuit. Accordingly, an adjustable capacitor 23 is connected across the coil 21 to bleed off an adjustable portion of this feedback signal and thus to prevent continuous oscillation of the detector.

In order to obtain a maximum gain in the transistor 13 so as to minimize the number of stages of audio amplification required to drive the loud-speaker 17, it is desirable to operate the detector circuit super-regeneratively, and therefore, a capacitor 24 is serially connected between the positive pole of the battery 20 and the base of the transistor 13 and a fixed resistor 25 and an adjustable resistor 26 are serially connected between the base of the transistor 13 and the negative pole of the battery 20. Therefore, as the capacitor 24 is charged by the current which flows from the battery 20 through the resistors 25 and 26, the base of the transistor 13 gradually becomes increasingly negative until the base voltage becomes sufficiently negative to enable the detector circuit to oscillate. When the oscillations build up to a point where emitter-to-base current flows, the capacitor 24 quickly discharges through the emitter-to-base circuit thereby to return the base voltage to that of the positive pole of the battery 20, and oscillations terminate. No further oscillation occurs until the capacitor 24 once more charges up to the point where oscillations can again develop. The detector circuit is thus operated super-regeneratively at a quench frequency determined by the various time constants of the circuit.

It has been noted that the principal change which takes place in the detector when a carrier is initially received is that the D.C. collector current falls off about .02 percent as a result of a similar change in the D.C. collector-to-emitter resistance of the transistor 13. Therefore, in order to utilize this change in collector-to-emitter resistance to provide a usable signal for squelching the audio simplifier during a "no carrier" condition, there is provided a D.C. bridge circuit 30 whose input terminals are connected across the battery 20 and whose output terminals are connected respectively to the base and emitter of a PNP transistor 32 connected in a D.C. amplifier circuit. The resistor 26 constitutes one arm of the bridge 30, the collector-to-emitter resistance of the transistor 13 constitutes another arm of the bridge and the two remaining arms are constituted by a pair of resistors 33 and 34. The bridge 30 is rendered insensitive to any RF voltage which may be present in the collector circuit of the transistor 13 by means of a suitable bypass capacitor 35 which is effectively connected between the collector and emitter of the transistor 13.

The resistors 33 and 34 are preferably of equal value and the resistor 26 is adjusted to have a value which is somewhat greater than the collector-to-emitter resistance of the transistor 13 when a carrier to which the tank circuit comprising the antenna coil 11 is not received. Under these conditions the emitter of the transistor 32 is more negative than its base and the transistor 32 is thus cut off. The transistor 32 is connected in a bias circuit for the transistor 16 and causes the transistor 16 to be cut off whenever the transistor 32 is cut off. This bias circuit comprises a resistor 37 which is serially connected with a pair of batteries 39 and 41 in the emitter-to-collector circuit of the transistor 32. Furthermore, the resistor 37 is serially connected with the battery 39 in the emitter-to-base circuit of the transistors 16, and a resistor 40 and associated bypass capacitor 42 are connected across the serial combination of the batteries 39 and 41. It may thus be seen that the relative values of the resistors 37 and 40 may be adjusted to cut off the transistor 16 when the transistor 32 is cut off.

When a carrier wave is received by the receiver 10, the collector-to-emitter resistance of the transistor 13 increases thereby to cause the base voltage of the transistor 32 to decrease relative to the emitter voltage. Consequently, the transistor 32 conducts and increases the voltage drop across the resistor 37 to a value such that the emitter voltage of the transistor 16 exceeds the base voltage. The audio amplifier is thus unsquelched and can drive the loud-speaker 17 with the detected audio signal from the transformer 15.

By way of illustration only, and not by way of limiting this application thereto, the following component values have been found to give efficient operation in a particular construction of the disclosed radio receiver.

| | |
|---|---|
| Battery **20** | 8 volts |
| Battery **39** | 2.66 volts |
| Battery **41** | 1.33 volts |
| Resistor **33** | 50 ohms |
| Resistor **34** | 50 ohms |
| Resistor **37** | 0–10 Kilohms |
| Resistor **40** | 0–10 Kilohms |
| Potentiometer | 0–20 Kilohms |
| Transistor **13** | L–5108 |
| Transistor **16** | 2N–132 |
| Transistor **32** | 2N–132 |

While there has been described what is at present considered to be a preferred embodiment of the invention, it will be understood that various modifications may be made therein which are within the true spirit and scope of the invention as defined in the appended claims.

What is claimed as new and desired to be secured by Letters Patent of the United States is:

1. In combination in a radio receiver, an audio amplifier, a detector, the audio signal output circuit of said detector circuit being coupled to the signal input circuit of said audio amplifier, said detector comprising a transistor, said transistor being of the type in which the effective resistance between two electrodes of the transistor has a first value when a carrier wave of predetermined frequency is received and a different value when said carrier wave is not received, and a squelch circuit, said squelch circuit comprising a balanced four-arm resistance bridge, said two electrodes of said detector being connected in one arm of said bridge so that said effective resistance will determine the condition of balance of said bridge, and means responsive to the voltage across one diagonal of said bridge for selectively biasing said audio amplifier beyond cutoff.

2. In combination in a radio receiver, a superregenerative detector, an audio amplifier, the audio output of said detector being coupled to the input of said amplifier, an audio squelch circuit for use in said radio receiver, said detector being of the type the output circuit direct current resistance of which has a first value when a carrier wave is received by said receiver and a second value when a carrier wave is not received by said receiver, said squelch circuit comprising a resistance bridge, the output direct current circuit of said detector being connected in one arm of said bridge to change the balance of the bridge and to vary the voltage across one diagonal of said bridge in response to change in said resistance, a D.C. amplifier, the input of said D.C. amplifier being connected across said one diagonal of said bridge and responsive to said voltage developed across said diagonal, and means utilizing the output of said D.C. amplifier for controlling the bias in said audio amplifier in said receiver.

3. In a radio receiver, an audio amplifier, a detector circuit, said detector comprising a transistor, the signal output of said detector being coupled to the signal input of said amplifier, a squelch circuit, said squelch circuit comprising a bridge circuit having a pair of input terminals and a pair of output terminals, the arms of said bridge being resistive, one of said arms comprising the collector-to-emitter resistance of said transistor, and means responsive to the output from said bridge for biasing to cutoff said audio amplifier in said receiver.

4. In combination in a radio receiver, an audio amplifier and a detector circuit, the audio input circuits of said amplifier and the audio output circuit of said detector being coupled, said detector circuit comprising a transistor with an emitter and a collector, a four-sided balanced resistance bridge, the emitter-to-collector circuit of said transistor being connected for direct current in one arm thereof, means for energizing one diagonal of said bridge, means for deriving an output voltage from the other diagonal of said bridge, and means connected to said audio amplifier and responsive to said output voltage of a predetermined value for squelching said audio amplifier, said last-mentioned means including a D.C. amplifier which controls the bias on said audio amplifier.

5. A radio receiver comprising a superregenerative detector for a signal modulated carrier including a transistor having at least an emitter electrode and a collector electrode, said transistor being of the type in which the effective direct current resistance between the emitter and collector electrodes changes when a carrier is received, a loudspeaker, a signal amplifier coupled between said loudspeaker and said detector and responsive to the detected output signal from said detector for driving said speaker, and means connected between said detector and said amplifier and responsive to said emitter-to-collector direct current resistance of said transistor for selectively squelching said amplifier.

6. A radio receiver as set forth in claim 5 wherein said means includes a balanced bridge having said resistance in one arm thereof.

7. A radio receiver as set forth in claim 6 wherein said bridge comprises a first branch formed of first and second resistors of substantially equal value connected across the input terminals of said bridge, and a second branch including said emitter-to-collector resistance and a third resistor, the values of said resistance and said third resistor being substantially higher than that of said first and second resistors, and a D.C. amplifier is connected between the junction of said first and second resistors and the junction of said resistance and said third resistor.

References Cited in the file of this patent

UNITED STATES PATENTS

| | | |
|---|---|---|
| 2,147,595 | Hilferty | Feb. 14, 1939 |
| 2,341,325 | Kenefake | Feb. 8, 1944 |
| 2,590,310 | Hanchett | Mar. 25, 1952 |
| 2,840,699 | Carpenter | June 24, 1958 |
| 2,895,045 | Kagan | July 14, 1959 |
| 2,922,032 | Haas et al. | Jan. 19, 1960 |
| 2,982,854 | Durkee | May 2, 1961 |

UNITED STATES PATENT OFFICE

CERTIFICATE OF CORRECTION

Patent No. 3,038,071 June 5, 1962

John E. Durkee

It is hereby certified that error appears in the above numbered patent requiring correction and that the said Letters Patent should read as corrected below.

Column 2, line 36, for "simplifier" read -- amplifier --.

Signed and sealed this 30th day of October 1962.

(SEAL)
Attest:

ERNEST W. SWIDER
Attesting Officer

DAVID L. LADD
Commissioner of Patents